United States Patent Office 3,650,974
Patented Mar. 21, 1972

3,650,974
ALKALINE EARTH HALOSILICATE PHOSPHORS
Harold Francis Ward, London, England, assignor to Thorn Electrical Industries Limited, London, England
No Drawing. Filed May 13, 1969, Ser. No. 824,260
Int. Cl. C09k 1/54
U.S. Cl. 252—301.4 F     3 Claims

ABSTRACT OF THE DISCLOSURE

A phosphor for use in fluorescent lamps comprising an alakilne earth yttrium or lanthanum halosilicate activated by activating metal ions in the trivalent state and/or activating metal ions in the divalent state, e.g., by trivalent tin, antimony, terbium, cerium or europium ions.

---

The present invention relates to phosphors for use in discharge devices and more particularly to phosphors which are excited by ultra-violet radiation and are suitable for use in fluorescent lamps.

The phosphors according to the present invention comprise an alkaline earth yttrium or lanthanum halosilicate activated by trivalent and/or divalent ions, e.g. by trivalent tin, antimony, terbium, cerium or europium ions, by a mixture of trivalent cerium and divalent manganese ions, or a mixture of divalent lead and divalent manganese ions.

The phosphors may include ions of more than one of the alkaline earth metals magnesium, calcium, strontium and barium, and may include both yttrium and lanthanum ions.

When the constituents of the phosphors are present in the molar proportions indicated in the following formulae the phosphors have the apatite crystalline structure.

$$(4-x)M^{II}O:xR^{II}O:3M_2^{III}O_3:6SiO_2:L_2$$

and $$(4-3y)M^{II}O:yR_2^{III}O_3:3M_2^{III}O_3:6SiO_2:L_2$$

where $M^{II}$ represents one or more alkaline earth metal $M^{III}$ represents yttrium or lanthanum or a mixture thereof, $R^{II}$ represents an activator metal in the divalent state, $R^{III}$ represents an activator metal in the trivalent state, L is a halogen, for example fluorine, and $x$ and $y$ are the molar proportions of $R^{II}O$ and $R_2^{III}O_3$ respectively per mole of the phosphor.

It has been found, however, that phosphors can be obtained in which the molar proportions of the respective constituents deviate widely from the proportions indicated in the formulae given above. Phosphors which give good emission but in which the molar proportions deviate from those indicated in the general formulae, either with excess or deficiency of $M^{II}$ and $M^{III}$ are mainly of an apatite crystalline structure in the presence of other phases which arise from the deviation.

It has been found that the molar proportions may be varied as follows:

$SiO_2$ from 6.0 to 8.0
$(M^{II}O+R^{II}O)$ from 3.0 to 3.9
$M_2^{III}O_3$ from 2.4 to 3.0
$R^{II}O$ and $R_2^{III}O_3$ from 0.1 to 1.0

The preferred ranges are as follows:

$SiO_2$ from 6.0 to 6.6
$(M^{II}O+R^{II}O)$ from 3.2 to 3.7
$M_2^{III}O_3$ from 2.6 to 3.0

When $R^{II}O$ is manganese oxide the preferred range is 0.2 to 0.6, and when $R_2^{III}O_3$ is cerium or europium oxide the preferred range is 0.3 to 0.6.

The alkaline earth halosilicate phosphors may be prepared by blending together silica and compounds, including a halide, of the metals to form a mixture which on heating will decompose and combine to form the halosilicate. As is well known in the formation of halosilicates the molar proportion of the halogen in the mixture may be in excess of 2.0 in order to promote the reaction. The mixture may be fired in a silica crucible at temperatures ranging from 1000 to 1300° C. In order to obtain the best phosphors metal compounds of luminescent grade quality should be use. The firing conditions should be chosen so as to maintain the metals in the required valency states. For example, when cerium is used as an activator the mixture should be fired under reducing conditions to maintain cerium in the trivalent state.

It has also been found that the use of yttrium or lanthanum silicate as an ingredient in the mixture enables less excess fluorine to be used in the preparation and gives a softer product. Yttrium or lanthanum silicate can be prepared by heating together 1 mole of yttrium or lanthanum oxide, 2.1 moles of silica and a flux such as ammonium fluoride (approximately 10 mole percent) at 1200° C. for 1 hour.

EXAMPLE 1

|  | 1(a), G. |
|---|---|
| Strontium carbonate—3.75 g. | 6.0 |
| Strontium fluoride—6.25 g. | 4.5 |
| Cerous oxalate—10.5 g. | 10.5 |
| Yttrium oxide—22.0 g. | -- |
| Silicic acid—14.5 g. (90% $SiO_2$) | -- |
| Yttrium silicate prep. | 35.0 |

The materials were blended together and fired in a silica crucible in a reducing atmosphere for 1 to 1½ hours at 1150–1200° C. The resultant powders were deep blue emitting phosphors when excited by long or short wave ultra-violet. When coated on a tube and made into a fluorescent lamp the emission was between 3500 A. and 5500 A. and peaked at 4100 A.

Substitution of magnesium or calcium for strontium gave blue emitting phosphors of increased wavelength limits, and substitution of barium for strontium gave a phosphor having a longer peak wavelength peaking at approximately 4250 A.

Substitution of lanthanum for ytrrium gave in all cases a slightly shorter peak wavelength. For example, for the strontium lanthanum phosphor the peak was at 3900 A. and for the barium lanthanum phosphor at 4050 A.

EXAMPLE 2

|  | 2(a), G. |
|---|---|
| Strontium carbonate—0.75 g. | 3.0 |
| Manganese carbonate—2.2 g. | -- |
| Strontium fluoride—6.25 g. | -- |
| Lanthanum oxide—32.0 g. | -- |
| Cerous oxalate—10.5 g. | 10.5 |
| Silicic acid—14.5 g. (90% $SiO_2$) | -- |
| Lanthanum silicate prep. | 45.0 |

These materials were blended together and fired in a silica crucible in a reducing atmosphere for 1 to 1½ hours at 1150 to 1200° C. The resultant powders were pink emitting phosphors to both long and short ultraviolet radiation.

Substituting magnesium or barium for strontium gave pink to weak red emitting phosphors, and substituting yttrium for lanthanum did not change the emission colour.

EXAMPLE 3

|  | 3(a), G. |
|---|---|
| Calcium carbonate—2.5 g. | 4.0 |
| Calcium fluoride—3.9 g. | 2.8 |
| Europium oxide—5.25 g. | 5.25 |
| Yttrium oxide—22.0 g. | -- |
| Silicic acid—14.5 (90% $SiO_2$) | -- |
| Yttrium silicate prep. | 35.0 |

These materials were blended together and fired in a silica crucible in air for 1 to 1½ hours at 1150 to 1200° C. The resultant powders were red emitting phosphors to both long and short ultra-violet radiation.

Substituting magnesium, strontium or barium for calcium did not change the mission colour. Substituting lanthanum for yttrium gave no emission colour change.

EXAMPLE 4

|  | G. |
|---|---|
| Calcium carbonate | 6.9 |
| Calcium fluoride | 4.9 |
| Tin oxide | 0.25 |
| Yttrium oxide | 22.9 |
| Silicic acid (90% silica) | 14.5 |

This is treated in the same way as Example 1. The resultant phosphor gives a blue-white emission and a short UV. only. Substituting strontium and/or barium for calcium gave similar colours.

EXAMPLE 5

|  | G. |
|---|---|
| Calcium carbonate | 4.2 |
| Calcium fluoride | 5.2 |
| Lead oxide | 0.5 |
| Manganese carbonate | 1.0 |
| Yttrium oxide | 22.9 |
| Silicic acid (90% slica) | 14.9 |

These materials were blended together and fired in air at 1150° C. for one hour. The resultant phosphor gave an orange-yelow emission.

EXAMPLE 6

|  | G. |
|---|---|
| Calcium carbonate | 5.5 |
| Calcium fluoride | 4.7 |
| Antimony oxide | 0.7 |
| Yttrium oxide | 22.0 |
| Silicic acid (90% silica) | 14.5 |

These materials were blended together and fired in air at 1150° C. for one hour. The resultant phosphor gave a blue-white emission under a short UV.

EXAMPLE 7

|  | G. |
|---|---|
| Calcium carbonate | 4.2 |
| Calcium fluoride | 5.2 |
| Terbium oxide | 0.9 |
| Yttrium oxide | 22.0 |
| Silicic acid (90% silica) | 14.9 |

These materials were blended together and fired in air at 1150° C. for one hour. The resultant phosphor gave a yellow-green emission.

I claim:

1. A phosphor consisting essentially of an alkaline earth fluorosilicate of a metal selected from the group consisting of yttrium and lanthanum activated by trivalent and divalent activating metal ions wherein the trivalent ions are selected from the group consisting of tin, antimony, terbium, cerium and europium and the divalent ions are selected from the group consisting of lead and manganese and wherein the constituents are present in the following molar amounts:

$SiO_2$ from 6.0 to 8.0
$(M^{II}O + R^{II}O)$ from 3.0 to 3.9
$M_2^{III}O_3$ from 2.4 to 3.0
$R^{II}O$ and $R_2^{III}O_3$ from 0.1 to 1.0 where $M^{II}$ represents an alkaline earth metal, $M^{III}$ represents said metal selected from the group consisting of yttrium and lanthanum, $R^{II}$ represents said divalent activating metal and $R^{III}$ represents said trivalent activating metal.

2. The phosphor of claim 1 wherein $R_2^{III}O_3$ represents cerium oxide and $R^{II}O$ represents manganese oxide.

3. The phosphor of claim 2 wherein said manganese oxide is present in a molar proportion of from 0.2 to 0.6.

References Cited

UNITED STATES PATENTS

| 2,467,689 | 4/1949 | Overbeek | 252—301.4 F |
| 3,523,091 | 8/1970 | McAllister | 252—301.4 F |

OTHER REFERENCES

Ranby—Magnesium Fluorosilicate Phosphors—Journal of the Electrochemical Society, vol. 102, No. 11, November 1955, pp. 631–635.

ROBERT D. EDMONDS, Primary Examiner